Figure 1:
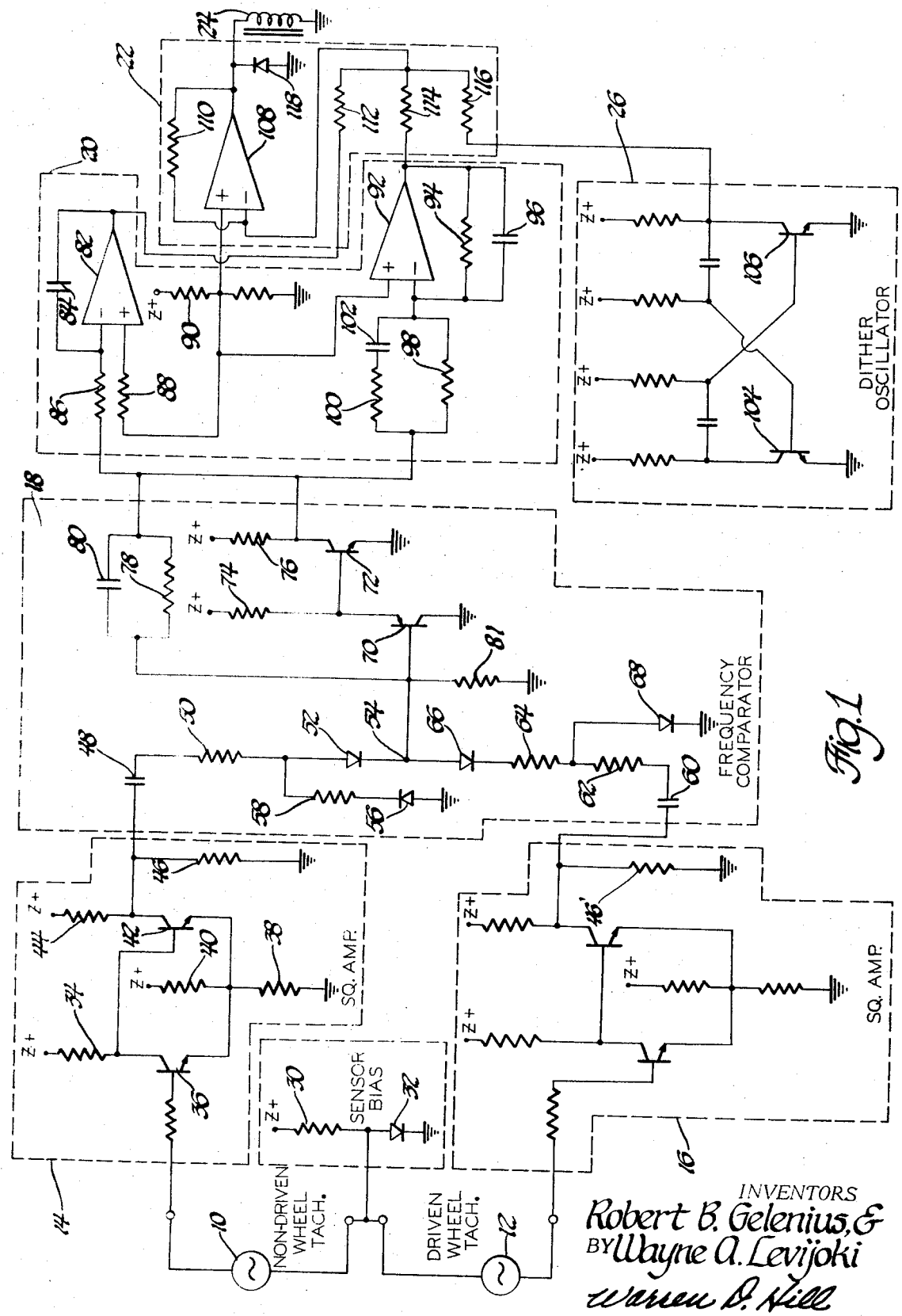

United States Patent [19]
Gelenius et al.

[11] 3,752,249
[45] Aug. 14, 1973

[54] COMBINED WHEEL SLIP LIMITING AND VEHICLE SPEED LIMITING APPARATUS

[75] Inventors: Robert B. Gelenius, Davison; Wayne A. Levijoki, Flushing, both of Mich.

[73] Assignee: General Motors Corporation, Detroit, Mich.

[22] Filed: Aug. 27, 1971

[21] Appl. No.: 175,629

[52] U.S. Cl. ............ 180/82 R, 180/105 E, 105/61, 303/21 EB, 318/328
[51] Int. Cl. ............................................ B60k 31/00
[58] Field of Search ............. 180/82, 105 R, 105 E; 318/52, 314, 319, 328; 317/5, 19; 105/61; 291/2; 303/21 BE, 21 CE, 21 EB

[56] References Cited
UNITED STATES PATENTS

| | | | |
|---|---|---|---|
| 2,908,264 | 10/1959 | Kerr | 180/105 R |
| 3,130,805 | 4/1964 | Carter et al. | 318/52 X |
| 3,400,776 | 9/1968 | Smith | 303/21 BE X |
| 3,437,896 | 4/1969 | Hoge | 318/52 |
| 3,560,759 | 2/1971 | Buehler et al. | 318/52 X |
| 3,622,977 | 11/1971 | Wakamatsu | 180/105 E X |
| 3,637,264 | 1/1972 | Leiber et al. | 303/21 BE |

*Primary Examiner*—Kenneth H. Betts
*Assistant Examiner*—Reinhard Eisenzopf
*Attorney*—Warren D. Hill et al.

[57] ABSTRACT

Maximum traction of a vehicle during acceleration is assured by a circuit responsive to signals from driven and non-driven wheel transducers including a frequency comparator for determining the difference in wheel speeds and an electro-vacuum servo motor in the engine throttle linkage responsive to a predetermined wheel speed difference for reducing engine torque output upon excessive slipping of the driven wheels. The non-driven wheel speed signal is limited to a maximum at a predetermined speed so that at higher vehicle speeds a simulated wheel slip signal is generated to reduce engine torque and limit vehicle speed.

3 Claims, 2 Drawing Figures

COMBINED WHEEL SLIP LIMITING AND VEHICLE SPEED LIMITING APPARATUS

This invention relates to a wheel slip limiting apparatus and more particularly to such an apparatus which includes an electrical control for limiting wheel input torque in the event of excess wheel slip or excessive vehicle speed. It is a common experience with automotive vehicles for excess wheel slip or spinning to occur during vehicle acceleration. This happens when the operator causes an extremely high engine torque to be delivered to the driven wheels such that the frictional forces between the tire and the road are overcome. In the event that the road surface is slippery, a moderate engine torque can cause such slipping. While a small amount of slip between the tire and road surface is necessary to achieve a driving force, excessive slip results in the reduction of effective driving force or traction.

It has at times been proposed to limit speeds attainable by a vehicle to a prescribed maximum. Where nominal maximum speed limits are imposed it is desired to allow a momentary speed increase over the nominal maximum speed in emergency situations.

It is therefore a general object of the invention to provide an apparatus serving the dual function of providing maximum traction during vehicle acceleration and limiting vehicle velocity by reducing the engine torque when a driven wheel slips excessively or the vehicle speed exceeds a preset value.

It is a further object of the invention to provide in a wheel slip limiting apparatus the additional function of preventing a sustained vehicle velocity above a preset value without additional components or cost of the apparatus.

It is a further object of the invention to control excessive slip of a driven vehicle wheel and to control excessive vehicle speed by a unitary electrical circuit and a throttle-controlling servomotor.

The invention is carried out by providing an electrical control including a driven wheel transducer and a non-driven wheel transducer to generate signals proportional to the respective wheel speeds including a circuit for limiting the non-driven wheel speed to a value representing a desired maximum vehicle speed, a circuit for comparing the speed signals and providing an output representing excessive slip or, in the case of excessive vehicle speed, simulated excessive slip of the driven wheel, and a servomotor responsive to the output to control the engine throttle to reduce engine torque to prevent excessive wheel slip or a sustained vehicle velocity above the desired maximum.

Figure 2:
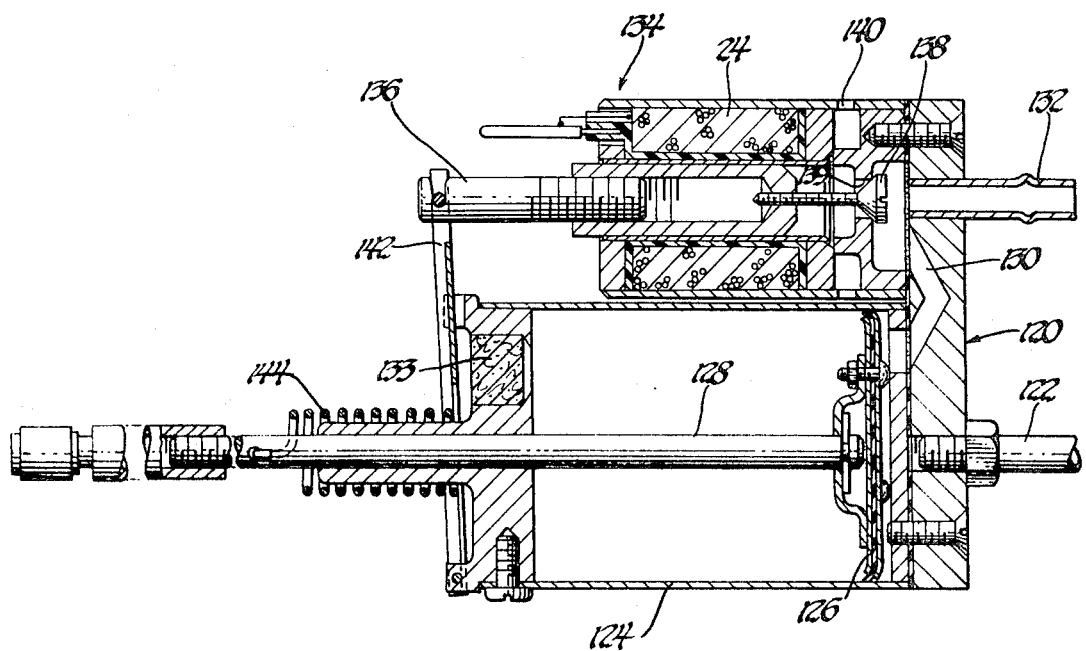

The above and other advantages will be made more apparent from the following specification taken in conjunction with the accompanying drawings wherein like reference numerals refer to like parts and wherein:

FIG. 1 is a diagram of the electrical control circuit according to the invention; and, FIG. 2 is a sectional view of the servomotor control operated by the circuit of FIG. 1.

During vehicle acceleration, slipping between the driven wheels and the road surface is always present; otherwise, no tractive force will be developed. The amount of slip increases as driving torque applied to the wheels increases until the wheel traction reaches maximum and thereafter traction decreases with further increase of wheel slip. The point of maximum traction varies according to road conditions. However, a representative value of about 4 mph wheel slip is selected as that corresponding to maximum traction. The term "wheel slip" as used herein is defined as $$\text{Wheel Slip} = W_d - W_n$$

where $W_n$ is the speed of a non-driven wheel and $W_d$ is the speed of a driven wheel. The term excessive wheel slip as used herein means the amount of wheel slip in excess of that required for maximum traction.

The purpose of the apparatus of this invention is to limit the engine torque applied to the driven wheels when the wheel slip exceeds a predetermined value such as 4 mph and to reduce the engine torque as a function of the amount by which the wheel slip exceeds the predetermined optimum value and at the same time to provide a maximum vehicle speed controlled by the same apparatus wherein the engine torque is reduced as the vehicle speed exceeds a desired nominal maximum. An additional purpose of the apparatus is to allow a spurt of vehicle speed above the nominal maximum value for emergency passing situations.

Referring to FIG. 1, the apparatus includes a non-driven wheel tachometer 10 and a driven wheel tachometer 12. These tachometers may be of any type suitable for sensing the speeds of wheel rotation but preferably are of the toothed wheel variable reluctance electromagnetic transducer type including an output coil producing a generally sinusoidal signal having a frequency proportional to wheel rotation speed. In a conventional automobile, a non-driven wheel tachometer 10 is located to directly sense the speed of a non-driven front wheel and the driven wheel tachometer 12 is preferably arranged to sense the rotation of a vehicle propeller shaft which drives the rear wheels. The tachometers 10 and 12 are designed with different numbers of teeth so that they will produce equal frequencies for equal driven and non-driven wheel speeds, even though the driven wheel tachometer senses propeller shaft speed which differs by a fixed ratio from the driven wheel speed when there is no wheel slip. If desired, the number of teeth in the sensors may be made equal and the ratio compensated for electronically. The outputs of the tachometers 10 and 12 are fed to squaring amplifiers 14 and 16 respectively which produce square waves corresponding in frequency to tachometer outputs. The amplifiers are calibrated, however, to adjust the amplifier currents such that when the driven wheel speed equals the non-driven wheel speed, the amplifier currents will be equal.

The squaring amplifier outputs are fed to a comparator 18 which produces a DC output signal corresponding to the amount by which the average current of the amplifier 16 exceeds the average current of the amplifier 14. It is thus apparent that the comparator output is proportional to the excessive slip of the driven wheel. The comparator is further designed to limit the current from the non-driven wheel tachometer to a maximum value corresponding to a desired nominal maximum vehicle speed so that at vehicle speeds above the nominal maximum, the current output of amplifier 16 will exceed the current output of amplifier 14 to provide an apparent or simulated wheel slip. Since the squaring amplifier 14 has a higher current output than the output of amplifier 16, at equal wheel speeds, the comparator output will remain at a bias level until the actual wheel slip or the apparent wheel slip exceeds that required for maximum traction.

The output of the compartor 18 leads to a compensation network 20 which is of a type well-known in the art of closed loop controls for the purpose of preventing loop instability. The requirements of the compensation network for a given system depend upon the response and performance of the entire system and are generally designed by the use of Bodie plots, for example. The output of the compensation network leads to a driver 22 which amplifies the compensating signal to drive a coil 24 in the servo motor of FIG. 2. An optional input to the driver stage is a dither oscillator 26.

Referring to the details of the circuit, there is provided a regulated Z+ voltage from a power supply, not shown. A sensor bias circuit includes a resistor 30 and a diode 32 serially connected between Z+ and ground and having their mid-point connected to one side of each tachometer 10 and 12. The other sides of the tachometers 10 and 12 are connected to the squaring amplifiers 14 and 16 respectively.

The squaring amplifier 14 is basically a Schmitt trigger provided with hysteresis. A resistor 34 is connected between Z+ and the collector of a transistor 36. The transistor emitter is connected through a small bias resistor 38 to ground. A calibrating resistor 40 is connected between Z+ and the resistor 38. The calibrating resistor 40 is selected to provide a nominal bias on the emitter of about 0.1v. A second transistor 42 has its base connected to the collector of the transistor 36, the collector connected through a load resistor 44 to Z+ and its emitter connected to the emitter of transistor 36. A voltage dividing resistor 46 is connected between the collector of transistor 42 and ground. With this arrangement, when there is no signal induced in the coil 10, the transistor 36 is biased off so that the transistor 42 is driven to saturation. Then a signal of at least 0.1v must be produced across the tachometer 10 to change the state of the amplifier 14 and a voltage of −0.1v is necessary to return the amplifier to its initial state. That hysteresis is effective to eliminate the effects of low voltage noise in coil 10. The squaring amplifier 16 is identical to the amplifier 14 except that the resistors 46 and 46' are calibrated to provide equal amplifier current outputs when the driven wheel speed equals the non-driven wheel speed.

The comparator circuit 18 includes a capacitor 48, a resistor 50 and a diode 52 serially connected between the collector of transistor 42 and a junction point 54 with the diode poled to permit current flow from the capacitor toward the junction point. A diode 56 arranged to permit current flow toward the capacitor 48 and a resistor 58 are connected between ground and a point between the resistor 50 and the diode 52. A capacitor 60, resistors 62 and 64 and a diode 66 are serially connected between the output of the amplifier 16 and the junction point 54 with the diode 66 poled to permit current flow to the capacitor 60 from the junction point. A diode 68 connected between ground and the junction of resistors 62 and 64 is poled to permit current flow from capacitor 60 to ground. An operational amplifier including transistors 70 and 72 forms the output of the comparator circuit. The base of transistor 70 is connected to junction point 54, the collector is grounded and its emitter is connected through a resistor 74 to Z+. The transistor 72 has its based connected to the emitter of the transistor 70 and its emitter is grounded. The collector is connected through a load resistor 76 to Z+. A feedback resistor 78 connected between the collector of transistor 72 and the base of transistor 70 establishes the gain of the operational amplifier and a capacitor 80 across the resistor 78 performs a filtering action. A bias resistor 81 extending from the base of the transistor 70 to ground establishes a steady state voltage on the collector of the transistor 72, which voltage represents a bias level 4 mph below the reference voltage to be described. Thus, an actual or apparent wheel slip of 4 mph must occur in order for the comparator output to become equal to the reference voltage.

In operation, when the transistor 42 is turned off, high voltage will be applied to the capacitor 48 so that a charging current pulse is passed by the capacitor through the diode 52 to junction point 54. When the transistor 42 conducts, the capacitor 48 will discharge by way of the diode 56 and the transistor 42. In the same manner, the square wave pulses applied at the capacitor 60 by the amplifier 16 will charge the capacitor 60 through the diode 68 to ground and the capacitor 60 discharge will cause current flow from junction point 54 through resistors 62, 64 and the diode 66. In effect, the current through the diode 66 is subtracted from the current through the diode 52. When the current through the diode 52 is greater than the current through the diode 66, the operational amplifier will be driven toward saturation. When, however, the current through the diode 66 exceeds the current through the diode 52 and the base of the transistor 70 tends to decrease in voltage, the transistor 70 will begin to conduct and the transistor 72 will become less conductive so that its collector voltage will linearly increase in value proportional to the difference in the diode currents, which is proportional to the amount of excessive wheel slip.

To achieve the function of a maximum vehicle speed limit without having to add components or expense to the basic wheel slip control circuit, the resistor 50 in the comparator is calibrated to effect saturation of the capacitor 48 at the desired speed limit. That is, the charge and discharge time of the capacitor 48 is so selected that essentially complete charge and discharge is effected in each cycle during operation below the speed limit. Above the speed limit the circuit time delay is such that the capacitor will not completely charge and discharge in each cycle whereby the current flow therethrough and through the diode 52 will no longer be proportional to non-driven wheel speed. The time delay of the circuit including capacitor 60, however, is selected so that saturation does not occur and current through diode 66 will be proportional to speed at any speed value. Thus the circuit will in effect provide an apparent or simulated wheel slip signal at speeds above the desired maximum limit.

The compensation network 20 includes an integrator comprising an operational amplifier 82 with a feedback capacitor 84, and an input resistor 86 connected to its negative input and to the output of the comparator 18. The positive input of the operational amplifier 82 is connected through a resistor 88 to a reference voltage derived from a voltage divider 90 connected between Z+ and ground. The compensation network also includes a combined proportional and derivative circuit comprising an operational amplifier 92 having a feedback resistor 94 and a feedback filtering capacitor 96. The positive input of the operational amplifier is connected to the voltage divider 90 and the negative input is connected to the output of the comparator 18 through a parallel circuit having a resistor 98 in one branch and resistor 100 and capacitor 102 in another branch. The outputs of the operational amplifiers 82 and 92 are connected to the driver 22. In addition to preventing loop instability, the compensation network has a feature which affects the speed limiting function. Since the compensation network includes an integrator, its output is, to some extent, delayed. Accordingly, as vehicle speed increases to the nominal speed limit, say 85 mph, the control loop will not instantly respond to cause the throttle to close and therefore allows vehicle speed to increase to a higher value, say 95 mph, for a short time. When the control responds, the throttle will partially close to return the vehicle speed to 85 mph. This feature is useful for allowing a brief spurt of speed above the nominal limit in an emergency passing situation.

The dither oscillator 26 is a standard astable multivibrator including transistors 104 and 106 designed to operate below the natural resonant frequency of the throttle actuator and carburetor linkage system. The frequency of oscillation will be about 15 Hz. Its purpose is to reduce the actuator system hysteresis. The oscillator output is a square wave signal that switches from Z+ to ground and is fed into an input of the driver 22.

The driver 22 comprises an operational amplifier 108 with a feedback resistor 110 to establish the amplifier gain. The positive input is connected to the reference voltage at the voltage divider 90 while the negative input terminal is connected through resistors 112, 114 and 116 to the operational amplifiers 82, 92 and dither oscillator 26 respectively. A spike suppressing diode 118 is connected between ground and the output of the operational amplifier 108, which output is connected directly to the coil 24 of the servomotor or actuator.

Referring to FIG. 2, the servomotor for reducing engine torque comprises a housing 120 connected to a link 122 from the vehicle accelerator pedal and includes a cylinder 124 containing a piston 126 and a connecting rod 128 extending from the piston to the throttle, not shown. The conventional throttle return spring, also not shown, biases the connecting rod 128 toward the left or throttle closed position. The right end of the cylinder 124 is connected by a passage 130 to the engine manifold via a conduit 132 so that normally, low pressure is available at the right side of the piston 19. The left side of the cylinder 124 includes a filtered port 133 admitting atmospheric pressure to the left side of the piston 126. Therefore, the piston 126 is normally urged to the extreme righthand side of the cylinder to provide a substantially rigid connection between the link 122 and the connecting rod 128 so that the throttle position is controlled only by the accelerator pedal. A solenoid valve 134 includes the solenoid coil 24 and an armature 136 which carries a valve 138. The valve 138 normally closes a port 139 interconnecting the vacuum passage 130 with atmospheric pressure which is provided through a vent 140. A feedback link 142 is pivoted at one end to the housing 120 and is connected at the other end by a pin and slot connection to the armature 136. A feedback spring 144 in tension is connected between the connecting rod 128 and the feedback link 142. The spring force biases the armature 136 to valve closed position.

In operation, when current is supplied to the solenoid, the valve 138 will move to open position to allow atmospheric air flow to vacuum passage 130, thus increasing the pressure on the right side of the piston 126 and allowing the throttle return spring to pull the piston 126 toward the left so that the throttle will move toward closed position. The consequent movement of the connecting rod 128 therefore extends the spring 144 to increase the force acting on the feedback link 142 to tend to close the valve 138. The amount of spring extension and throttle closure required to seat valve 138 is proportional to the amplitude of the solenoid current. Therefore, for a given solenoid current, the connecting rod 128 will move a corresponding distance to the left until the force of the spring 144 balances the solenoid force on the armature 136. The valve 138 then will rapidly open and close or dither to modulate pressure in the vacuum passage to a value required to maintain piston 126 in that new position. Accordingly, in response to excess wheel slip or excessive vehicle speed, the effective length of the throttle linkage will be increased to move the throttle valve toward closed position to reduce engine torque. It should be noted that in the event of failure of either the electrical or the mechanical portions of the system, the linkage will return to either closed throttle or the rigid link condition.

The embodiment of the invention described herein is for purposes of illustration and the scope of the invention is intended to be limited only by the following claims.

What is claimed is:

1. In a vehicle having an engine, a wheel driven by the engine and a non-driven wheel, the driven wheel being liable to slipping in excess of that required for maximum traction in the event excessive torque is applied thereto by the engine, apparatus for limiting excessive slipping of the driven wheel and for limiting vehicle velocity comprising first detector means responsive to the speed of the driven wheel for producing an electrical signal as a function of driven wheel speed, second detector means responsive to the speed of the non-driven wheel for producing an electrical signal as a function of non-driven wheel speed, including means to limit the non-driven wheel speed signal to a maximum at a desired nominal maximum vehicle speed, means for comparing the wheel speed signals to determine the excess of the driven wheel speed signal over the non-driven wheel speed signal and means for reducing engine torque when the driven wheel speed signal exceeds the non-driven wheel speed signal to prevent a sustained vehicle speed above the nominal maximum speed and to prevent a sustained excessive wheel slip.

2. In a vehicle having an engine, a wheel driven by the engine and a non-driven wheel, the driven wheel being liable to slipping in excess of that required for maximum traction in the event excessive torque is applied thereto by the engine, apparatus for limiting excessive slipping of the driven wheel and for limiting vehicle velocity comprising first detector means responsive to the speed of the driven wheel for producing an electrical signal proportional to driven wheel speed, second detector means responsive to the speed of the non-driven wheel for producing an electrical signal generally proportional to non-driven wheel speed, each electrical signal being a capacitor current, means limiting the capacitor current of the non-driven wheel signal to a maximum at a desired nominal maximum vehicle speed, means for comparing the wheel speed signals to determine the excess of the driven wheel speed signal over the non-driven wheel signal speed and means for reducing engine torque when the driven wheel speed signal exceeds the non-driven wheel speed signal to prevent a sustained vehicle speed above the nominal maximum speed and to prevent a sustained excessive wheel slip.

3. In a vehicle having an engine, a wheel driven by the engine and a non-driven wheel, the driven wheel being liable to slipping in excess of that required for maximum traction in the event excessive torque is applied thereto by the engine, apparatus for limiting excessive slipping of the driven wheel and for limiting vehicle velocity comprising first detector means responsive to the speed of the driven wheel for producing an electrical signal proportional to driven wheel speed, second detector means responsive to the speed of the non-driven wheel for producing an electrical signal generally proportional to non-driven wheel speed, each electrical signal being a capacitor current, means limiting the capacitor current of the non-driven wheel signal to a maximum at a desired nominal maximum vehicle speed, means for comparing the wheel speed signals to determine the excess of the driven wheel speed signal over the non-driven wheel speed signal to produce an output signal, a time delay circuit for delaying the output signal and means responsive to the delayed output signal for reducing engine torque when the driven wheel speed signal exceeds the non-driven wheel speed signal to prevent a vehicle speed above the nominal maximum speed after the time delay period and to prevent a sustained excessive wheel slip.

* * * * *